United States Patent [19]

Whitledge

[11] Patent Number: 4,718,551
[45] Date of Patent: Jan. 12, 1988

[54] COLLATION STRIP

[75] Inventor: Jon K. Whitledge, Ravenna, Ohio

[73] Assignee: Erico International Corporation, Solon, Ohio

[21] Appl. No.: 919,982

[22] Filed: Oct. 17, 1986

[51] Int. Cl.⁴ .............................................. B65D 85/24
[52] U.S. Cl. .................................. 206/347; 206/343; 206/820
[58] Field of Search ............................... 206/338–348, 206/820; 227/136, 138, 147, 149

[56] References Cited

U.S. PATENT DOCUMENTS

| | | |
|---|---|---|
| 3,812,961 | 5/1974 | Merrick et al. ........................ 206/338 |
| 3,892,313 | 7/1975 | Lange ..................................... 206/347 |
| 3,944,067 | 3/1976 | Bakoledis .............................. 206/347 |
| 4,047,611 | 9/1977 | Damratowski ........................ 206/820 |
| 4,106,618 | 8/1978 | Haytayan .............................. 206/820 |
| 4,106,619 | 8/1978 | Haytayan .............................. 206/820 |
| 4,298,121 | 11/1981 | Oide et al. ............................ 206/347 |

Primary Examiner—Jimmy G. Foster
Attorney, Agent, or Firm—Renner, Otto, Boisselle & Lyon

[57] ABSTRACT

A collation strip for use in conjunction with a power actuated tool having a plurality of cylindrical housings interconnected by narrow webs. The housings, each of which is adapted to receive an axially extending fastener, include a plurality of inwardly protruding circumferentially alternating ridges and arms. The ridges include at each axial end a pair of steps adapted to surround and receive the head of a fastener. The arms, which are somewhat flexible, are located towards the center of the housings and are adapted to engage, stabilize, and align the shank of the fastener. The ridges and arms cooperate to form a plurality of fracture zones between the ridges and arms. Upon deployment by a power tool of the fastener, such fracture zones allow the housing to fracture as a banana peel and split up into a plurality of pieces thus allowing the fastener to disengage completely and separate from the housing preventing the formation of a washer between the head of the nail and the surface into which the nail is deployed.

17 Claims, 5 Drawing Figures

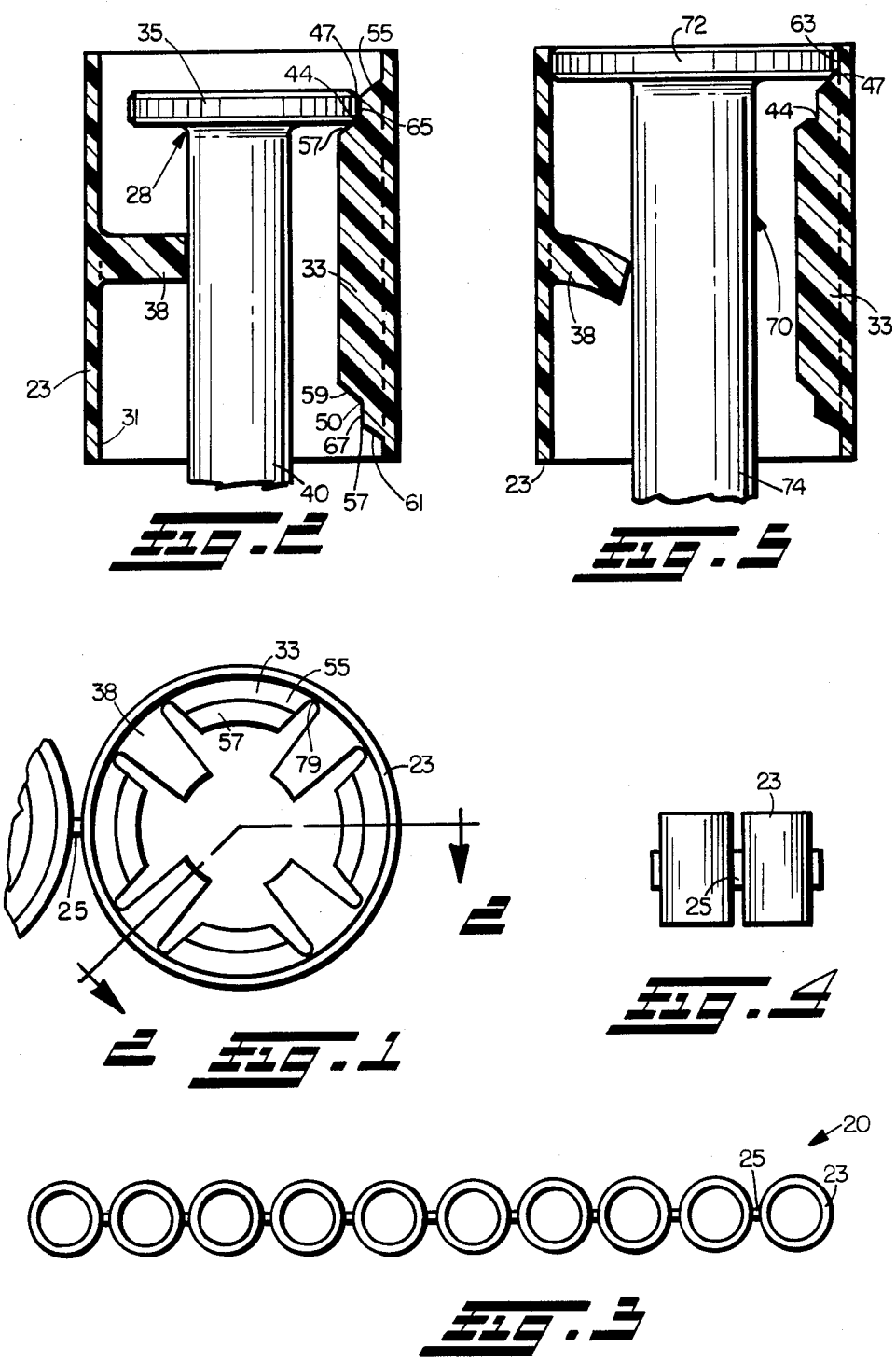

COLLATION STRIP

DISCLOSURE

This invention relates to a collation strip for receiving and supporting a plurality of fasteners. More particularly, the invention relates to a plastic collation strip which may be readily inserted into a power actuated tool to provide a supply of fasteners thereto.

BACKGROUND OF THE INVENTION

Power actuated tools for driving fasteners are widely used in the construction industry. Many of these power actuated tools are equipped to hold a plurality of fasteners so as to provide for the consecutive feeding of the fasteners and facilitate the continuous operation of the tool. The speed with which such tools can be loaded with fasteners is critical because the faster a tool can be loaded, the faster a series of fastening operations can be performed.

To facilitate the expeditious loading of fasteners into power tools various devices such as magazines, clips, strips, fastener packages, or the like, have been developed. Examples of such prior art devices may be found in Haytayan U.S. Pat. No. 4,106,618, Bakoledis U.S. Pat. No. 3,944,067. Merrick et al U.S. Pat. No. 3,812,961, Reynolds U.S. Pat. No. 3,624,867, Hilti U.S. Pat. No. 3,428,169, Anstett U.S. Pat. No. 3,211,284 and Hutchison U.S. Pat. No. 2,247,499.

Although these prior art devices provide a means for loading a plurality of fasteners into a tool, such devices present a variety of disadvantages and drawbacks. For examaple, the screw stick of Hutchison and the screw package of Merrick et al are rigid requiring the chamber of the tool which receives the fasteners to be straight. The requirement of a straight and neatly configured tool. Also, many of the prior art fastener clips result in the formation of a washer between the head of the fastener and the surface into which the fastener is mounted. This washer, which is sometimes intentionally formed, is the result in the complete separation of the fastener from the fastener clip. The washer may result in the loosening of the fastener when the washer works itself loose from beneath the head of the fastener or deteriorates. Additionally, most prior art devices or clips are only capable of supporting a single size of fastener. Thus, a specific type of clip or collation strip must be produced for each particular size of fastener.

Also, in some power fasteners, a constant amount of overdrive is required to purge the tool of the plastic of the collation strip. In other words, the plastic has to be driven out of the bore. This results in little or no nail depth control, which in some applications should vary.

Prior art tape collations, while easy to assembly, are too loose or flexible and require too many hands to feed a magazine efficiently. Such collations may also need a special jaw structure or centering device for guidance which opens after the strike. Such tape collations also are subject to jam-ups.

The present invention provides a collation strip which overcomes the disadvantages and drawbacks presented by these prior art devices.

SUMMARY OF THE INVENTION

The present invention provides a collation strip for use in conjunction with a power actuated tool. Generally, a collation strip made in accordance with the present invention comprises a plurality of cylindrical housings interconnected by narrow webs. The housings, each of which is adapted to receive an axially extending fastener, include a plurality of inwardly protruding circumferentially alternating ridges and arms extending from the inside diameter of the housing. The protruding ridges are stepped at each end and beveled to form at least two steps along the inside surface of the housing. Such steps at each end are recessed from the cylinder ends. Each of the steps is adapted to surround and receive the head of a fastener within the confines of the housing. The arms which are somewhat flexible are located towards the center of the housings and are adapted to engage, stabilize, and align the shank of the fastener.

The unique configuration of a strip made in accordance with the present invention provides various advantages. For example, the strip's unique configuration provides a for a plurality of fracture zones between each of the arms and ridges which allow the fastener to be completely separated from the strip upon deployment by the power actuated tool into which the strip has been loaded. The collation strip is designed to disintegrate as the head of a fastener is driven through its respective cylindrical housing in the fashion of a banana peel with the housing separating at its alternating weak points or fracture zones. Thus, the formation of a washer under the head of the fastener which may later work its way loos is avoided. Also, a particular strip is capable of supporting at least two different fastener sizes therein and such fasteners may be loaded from either end of the cylindrical housings.

The strip, in addition to providing sufficient resilient support to avoid the misalignment of the fasteners in the tool and the subsequent jamming thereof, provides sufficient flexiblity to allow the strip to be readily loaded into a tool having a receiving chamber with a curved configuration.

To the accomplishment of the foregoing and related ends, the invention, then, comprises the features hereinafter fully described and particularly pointed out in the claims, the following description and annexed drawing setting forth in detail certain illustrative embodiments of the invention, these being indicative, however, of but a few of the various ways in which the principles of the invention may be employed.

BRIEF DESCRIPTION OF DRAWING

In the annexed drawing:

FIG. 1 is an enlarged fragmentary top plan view of a single housing of a collation strip made in accordance with the present invention;

FIG. 2 is a cross sectional view of the sleeve of FIG. 1 taken along line 2—2 thereof illustrating a nail supported therein;

FIG. 3 is a closer to scale top plan assembly view of the entire collation strip partially illustrated in FIG. 1 with a fastener inserted in each housing thereof;

FIG. 4 is a fragmentary side view of the collation strip illustrated in FIG. 3; and FIG. 5 is a cross sectional view of the sleeve of Fig.1 showing a nail with an enlarged head supported therein.

DETAILED DESCRIPTION OF PREFERRED EMBODIMENT

Referring to the drawing and initally to FIG. 3 there is illustrated a collation strip 20 made in accordance with the present invention which is suitable for use in conjunction with a power actuated tool. The strip 20 comprises a plurality of cylindrical housing 23 each interconnected by a web 25. The webs 25 are centrally located and extend about a third of the height of the housing 23. This ensures the separation of one housing from the next as a fastener is driven from the housing by a power actuated tool. Also, the webs 25 are of sufficient length between the housings as to permit the strip 20 to be bent about a radius without any undue crowding or interference between the individual housings, thus allowing the collation strip 20 to be loaded in a power actuated tool having a curved or circular chamber. Each of the housings 23 is adapted to receive, support, and maintain aligned therein a headed fastener, or as illustrated a nail 28.

Referring to FIGS. 1 and 2 the means by which the nail 28 is supported by the housing 23 is more clearly illustrated. Specifically, the inside diameter 31 of the housing 23 includes a plurality of uniformly circumferentially spaced inwardly directed ledge forming ridges 33 which serve to support the head 25 of nail 28, and arms 38 which serve to engage, stabilize and align the shank 40 of the nail 28.

Each of the axially extending ridges 33 is beveled at both of its axial ends to form respectiveoly a pair of steps or ledges 44 and 47, and 50 and 53. These steps, which are adapted to receive and support the head 35 of a nail 28, each include a slightly inlined surface 55, 57, 59, 61, and a generally vertical run 65 and 67. As illustrated in FIG. 5, the steps 44 and 47 allow the housing 23 to accommodate different sizes of nails, nail 70 being considerably larger in head 72 and shank 74 diameter than nail 28. The length of the housing end 63 is such that nail heat 72 is fully seated within and surrounded by housing 23. Furthermore, the arm 38 must be sufficiently configured so as to allow the arm 38 to deflect and thus permit the larger shank 74 to be positioned in the housing 23.

Although in the illustrated embodiment, the axial ends of the ridges 33 have been beveled to form identically configured steps, it will be appreciated that each end may be provided with a different beveled step configuration so as to allow the strip 20 to accommodate nails of two different sizes at one end of the housing 23 and nails of two additionally different sizes at the other end of the housing 23, thus allowing housing 23 to accommodate up to four different sized nails. Preferably however, as illustrated, housing 23 is symmetrical about its horizontal mid-plane, each end of ridge 33 having the same beveled step configuration. Such a symmetrical configuration provides for easy loading, a user being capable of loading the same size of nail into housing 23 from either of the two ends.

As shown in FIG. 1, the arms 38 and ridges 33 are alternately disposed about the inner circumference of the housing 23 to form a plurality of fracture zones 79 between the arms 38 and ridges 33. Upon deployment by a power tool of the fastener, such fracture zones 79 allow the housing to fracture as a banana peel and split up into a plurality of pieces thus allowing the nails 28 or 70 to disengage completely and separate from the housing 23 preventing the formation of a washer between the head of the nail and the surface into which the nail is deployed.

As illustrated in FIG. 4 the webs 25 are centrally disposed along the outside diameter of the housing 23 and they extend only a fraction of the axial length of the housing. this particular web configuration allows a tool effectively to sever one housing and nail from the strip without disturbing the remaining nails and housings.

Preferably, the strip 20 is molded from a frangible plastic material such as, for example, a polyprophlene copolymer blend. Such a plastic should be hard or brittle enough to banana peel fracture as intended but no so hard that it will not flex to facilitate loading into the chamber of a power actuated tool, or not properly secure the fastener within the housing.

Even though the invention has been illustrated for use in conjunction with a nail, it will be appreciated that a collation strip made in accordance with the present invention may be used in conjunction with any one of a variety of headed fasteners such as roofing nails, pins, tacks, bolts, screws or the like.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

I claim:

1. A collation strip for headed fasteners having a head and shank comprising a plurality of web connected cylindrical housings of frangible material, each housing being adapted to receive and support headed fasteners of at least two different sizes extending axially therein, the interior of each housing including circumferentially spaced support means to surround and support the heads of such different sized fasteners within the confines of said housing, said support means comprising a plurality of protruding ridges located along the inside surface of said housing, and circumferentially alternating spaced guide means axially spaced from said first means to guide and aixally align and support the shank of such fastener.

2. A collation strip as set forth in claim 1 wherein said webs extend approximately one-third the height of said housings.

3. A collation strip as set forth in claim 2 wherein said webs are centered between the axial ends of said housings.

4. A collation strip as set forth in claim 2 wherein said webs are of sufficient length between the housings to allow said collation strip to be bent about a radius without any undue crowding or interference between the individual housings.

5. A collation strip as set forth in claim 1 wherein said frangible material comprises a polypropylene copolymer blend.

6. A collation strip as set forth in claim 1 wherein said guide means comprises a plurality of protruding arms located along the inside surface of each of said cylindrical housings.

7. A collation strip as set forth in claim 6 wherein said plurality of protruding arms are centrally disposed along the axial length of said housing.

8. A collation strip adapted for use in a power actuated tool supporting a plurality of headed fasteners having a head and a shank, said strip comprising a plurality of web connected cylindrical housings of frangible material, each housing being adapted to receive and support a headed fastener extending axially therein, the interior of each housing including circumferentially spaced protruding ridges to surround and support the head of such fastener having each of its axial ends beveled in a like manner to form a pair of steps, each of said steps being adapted to surround and receive the heads of two different sized fasteners, and a plurality of protruding arms axially to align and support the shank of such fastener circumferentially disposed along the interior of said housing and alternately spaced relative to said ridges.

9. A collation strip as set forth in claim 8 wherein said protruding ridges, said protruding arms, and said interconnecting webs are centrally disposed along the axial length of said housing such that said strip is symmetrical about its horizontal mid-plane to facilitate loading or assembly thereof.

10. A collation strip as set forth in claim 9 wherein each of said housings includes four of said arms and four of said ridges equally spaced about the interior of said housing.

11. A collation strip as set forth in claim 8 further including a plurality of fracture zones formed between each of said arms and ridges which allow said housings to disintegrate in a banana peel fashion as such fasteners are driven through said housings by such power actuated tool.

12. A collation strip for headed fasteners having a head and shank, said collation strip comprising a plurality of web connected cylindrical housings of frangible material, each of said housings adapted to receive and support such fastener therein, the interior of each of said housings including circumferentially spaced support means to surround and support the head of such fastener within the confines of said housing, and circumferentially alternating spaced guide means axially spaced from said support means to guide and axially align and support the shank of such fastener, said support means being adapted to support at least two different sizes of such fasteners and comprising a plurality of protruding ridges located along the inside surface of each of said housings, one axial edge of each of said ridges being beveled to form at at least two steps, each of said steps adapted to surround and receive the heads of such different sized fasteners.

13. A collation strip as set forth in claim 12 wherein the other axial end of each of said ridges is beveled to form at least two steps, each of said steps adapted to surround and receive the heads of different sized fasteners.

14. A collation strip as set forth in claim 13 wherein said beveled steps at each of the axial ends of said ridges are beveled in such a manner as to form the same size steps at each end of said ridges such that the steps at each of the axial ends of ridges are adapted to receive the heads of the same different sized fasteners.

15. A collation strip for headed fasteners having a head and shank comprising a plurality of cylindrical and symmetrical housings, each housing being adapted to receive and support a headed fastener extending axially therein from either axial end of said housing, the interior of said housing including circumferentially spaced support means in the proximity of each axial end of said housing such that each of said support means is equally spaced from the respective axial end of said housing, and circumferentially alternating spaced guide means centrally located along the axial length of said housing to guide and axially align and support the shank of such fastener.

16. A collation strip as set forth in claim 15 wherein each of said support means is adapted to accommodate and support at least two different size fasteners.

17. A collation strip as set forth in claim 16 wherein said means to support at least two different size fasteners comprises a plurality of protruding ridges located along the inside surface of each of said cylindrical housings.

* * * * *